US006941114B1

(12) United States Patent
Kuo et al.

(10) Patent No.: US 6,941,114 B1
(45) Date of Patent: Sep. 6, 2005

(54) USB-BASED WIRELESS TRANSMITTING/RECEIVING SYSTEM

(75) Inventors: Shyh-Ren Kuo, Taipei (TW); Chris Wang, Taipei (TW); Leo Kuan, Taipei (TW)

(73) Assignee: Behavior Tech Computer Corporation, Taipei (TW)

(*) Notice: Subject to any disclaimer, the term of this patent is extended or adjusted under 35 U.S.C. 154(b) by 0 days.

(21) Appl. No.: 09/536,599

(22) Filed: Mar. 28, 2000

(51) Int. Cl.[7] .............................................. H04B 1/40
(52) U.S. Cl. ........................ 455/74; 455/557; 455/334; 455/343.1; 455/572; 455/573; 455/701; 455/702; 710/300; 710/63; 710/106
(58) Field of Search ....................... 455/74, 701, 702, 455/334, 343, 572, 573, 574, 557, 343.1; 710/129, 100

(56) References Cited

U.S. PATENT DOCUMENTS

| | | | | |
|---|---|---|---|---|
| 5,890,015 A | * | 3/1999 | Garney et al. | 710/62 |
| 5,914,877 A | * | 6/1999 | Gulick | 364/400.01 |
| 5,953,511 A | * | 9/1999 | Sescila et al. | 710/315 |
| 5,991,546 A | * | 11/1999 | Chan et al. | 710/62 |
| 6,040,792 A | * | 3/2000 | Watson et al. | 341/100 |
| 6,073,205 A | * | 6/2000 | Thomson | 711/100 |
| 6,122,676 A | * | 9/2000 | Brief et al. | 710/9 |
| 6,122,749 A | * | 9/2000 | Gulick | 713/324 |
| 6,148,354 A | * | 11/2000 | Ban et al. | 710/102 |
| 6,151,645 A | * | 11/2000 | Young et al. | 710/63 |
| 6,154,663 A | * | 11/2000 | Itamochi | 455/569 |
| 6,192,230 B1 | * | 2/2001 | Bokhorst et al. | 455/343 |
| 6,206,480 B1 | * | 3/2001 | Thomson | 301/625 |

* cited by examiner

*Primary Examiner*—Marceau Milord
(74) *Attorney, Agent, or Firm*—Rosenberg, Klein & Lee

(57) ABSTRACT

A USB-based wireless transmitting/receiving system includes a transmitting portion connected to at least one USB-based peripheral device for receiving a signal from the peripheral device and a receiving portion connected to a computer host and coupled to the transmitting portion in a wireless fashion for receiving and applying the signal from the transmitting portion to the computer host whereby a wireless communication is established between the computer host and the USB-based peripheral device. Both the transmitting portion and the receiving portion include a central processing unit for processing signals received, a receiving unit for receiving signals, a transmitting unit for transmitting signals and a power supply system for powering the transmitting portion or the receiving portion. The power supply system includes a regulation circuit adapted to connect to an electric main. The power supply system may selectively include a primary battery set, a secondary battery set and/or a solar cell system, all connected to a controller to which the regulation circuit is also connected for selectively powering the transmitting portion or the receiving portion.

12 Claims, 4 Drawing Sheets

USB-BASED WIRELESS TRANSMITTING/RECEIVING SYSTEM

FIELD OF THE INVENTION

The present invention generally relates to a wireless transmitting/receiving system, and in particular to a wireless connection between USB-based computer peripheral devices and a computer host.

BACKGROUND OF THE INVENTION

Conventionally, a computer communicates with peripheral devices via cables or wires. The cable or wire that connects a peripheral device to a computer host via interface circuit and buses. RS-232 is one of the conventional interfaces incorporated in a computer for communication with peripheral devices. High speed interfaces, such as Universal Serial Bus (USB), are being developed to replace the conventional RS-232 for providing high speed data transmission.

FIG. 1 of the attached drawings shows a known configuration of USB-based connection between a computer host 12 and peripheral devices, such as a keyboard 13, a mouse 14, a joystick 15 and a printer 16. The USB-based connection comprises a USB hub 10 connected to the computer host 12 by a USB cable 11. The peripheral devices 13–16 are connected to the hub 10 by cables (not labeled) of their own. The cables connecting the hub 10, the computer host 12 and the peripheral devices 13–16 interfere with the activity of a computer user and limit maneuversability of the peripheral devices. The distance between the peripheral devices and the computer host is limited by the length of the cables.

To solve the problems, a USB-based wireless transmitting/receiving system is provided by the present invention for forming a wireless connection between a computer host and at least one peripheral device.

SUMMARY OF THE INVENTION

Accordingly, an object of the present invention is to provide a USB-based wireless transmitting/receiving system for forming a wireless connection between a computer host and a peripheral device.

Another object of the present invention is to provide a wireless connection between a computer host and a peripheral device, the wireless connection having a simple structure and allowing high speed data transmission.

To achieve the above objects, in accordance with the present invention, there is provided a USB-based wireless transmitting/receiving system comprising a transmitting portion connected to at least one USB-based peripheral device for receiving a signal from the peripheral device and a receiving portion connected to a computer host and coupled to the transmitting portion in a wireless fashion for receiving and applying the signal from the transmitting portion to the computer host whereby a wireless communication is established between the computer host and the USB-based peripheral device. Both the transmitting portion and the receiving portion comprise a central processing unit for processing signals received, a receiving unit for receiving signals, a transmitting unit for transmitting signals and a power supply system for powering the transmitting portion or the receiving portion. The power supply system comprises a regulation circuit adapted to connect to an electric main. The power supply system may selectively include a primary battery set, a secondary battery set and/or a solar cell system, all connected to a controller to which the regulation circuit is also connected for selectively powering the transmitting portion or the receiving portion.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
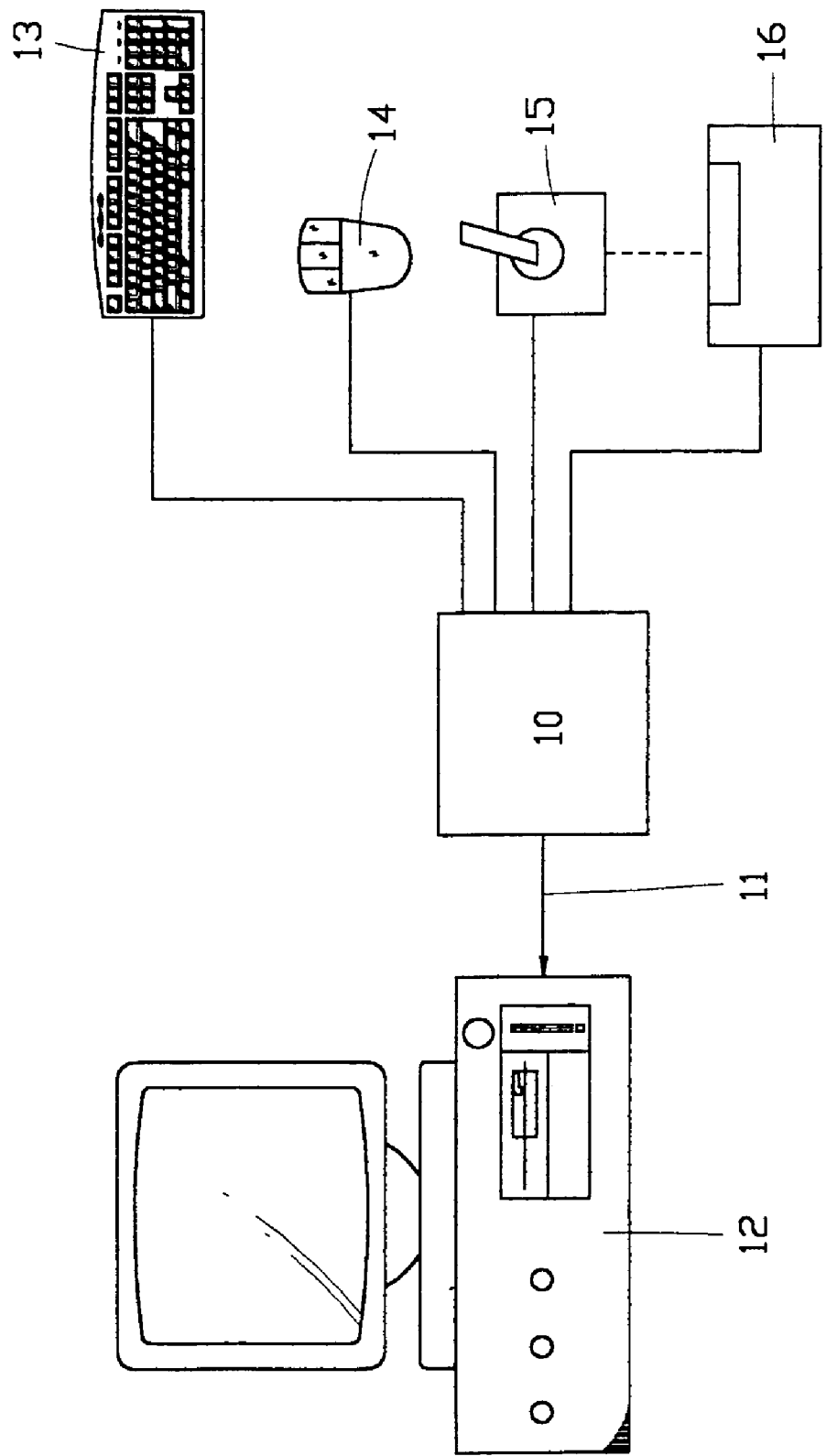
FIG. 1 is a schematic view showing a conventional USB-based connection between a computer host and peripheral devices.
Figure 2:
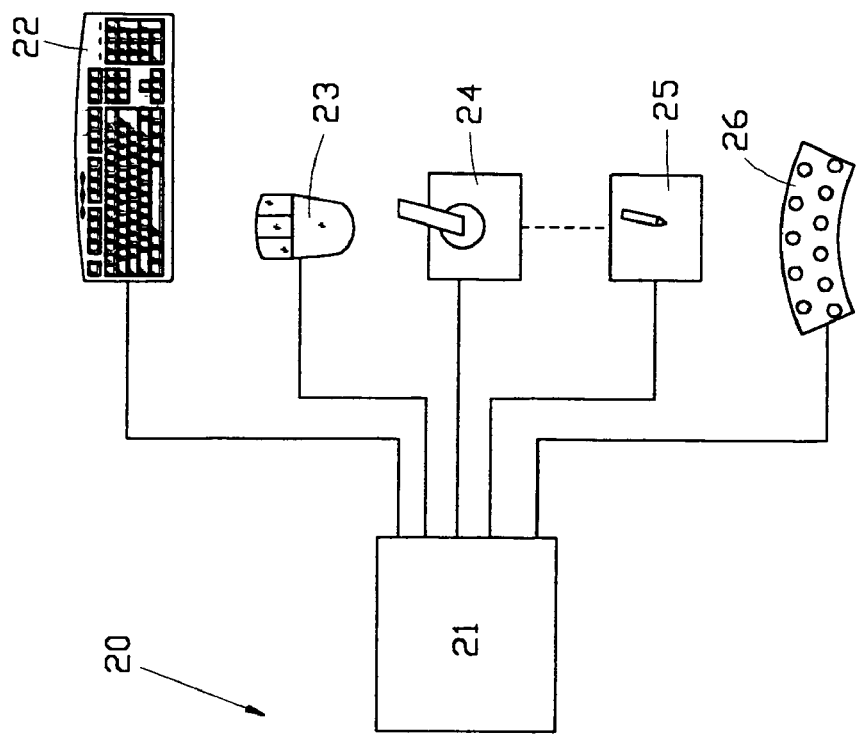
FIG. 2 is a schematic view showing a USB-based wireless transmitting/receiving system arranged between a computer host and peripheral devices in accordance with the present invention.
Figure 2:
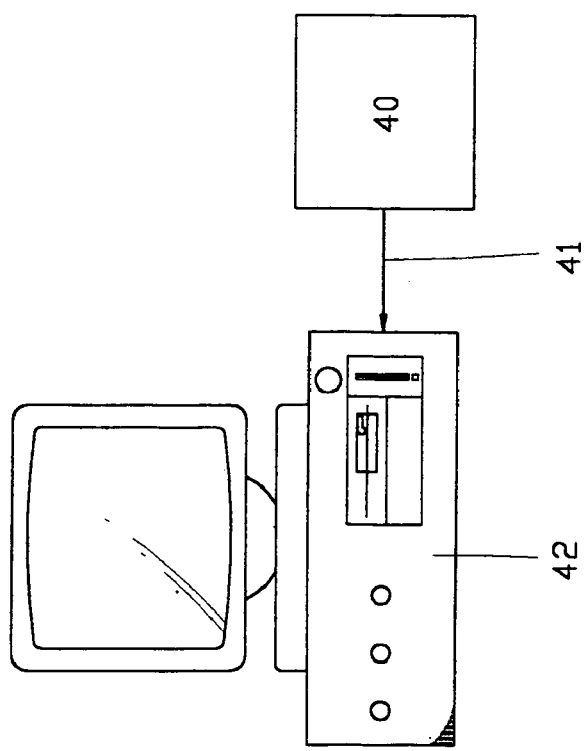

With reference to the drawings and in particular to FIG. 2, wherein a USB-based wireless transmitting/receiving system constructed in accordance with the present invention, generally designated by reference numeral 20, is shown for forming a wireless connection between a computer host 42 and peripheral devices, such as a keyboard 22, a mouse 23, a joystick 24, a writing pad 25 and a game controller 26, the USB-based wireless transmitting/receiving system 20 comprises a transmitting portion 21 coupled to the peripheral devices 22–26 and a receiving portion 40 connected to the computer host 42 by a USB cable 41 whereby signals from the peripheral devices 22–26 are transmitted by the transmitting portion 21 to the computer host 42 via the receiving portion 40.

Signal transmission between the transmitting portion 21 and the receiving portion 40 may be done by any known means, such as consumer infra-red transmission, Irda-based transmission and unidirectional and bi-directional radio frequency (RF) transmission.

Figure 3:
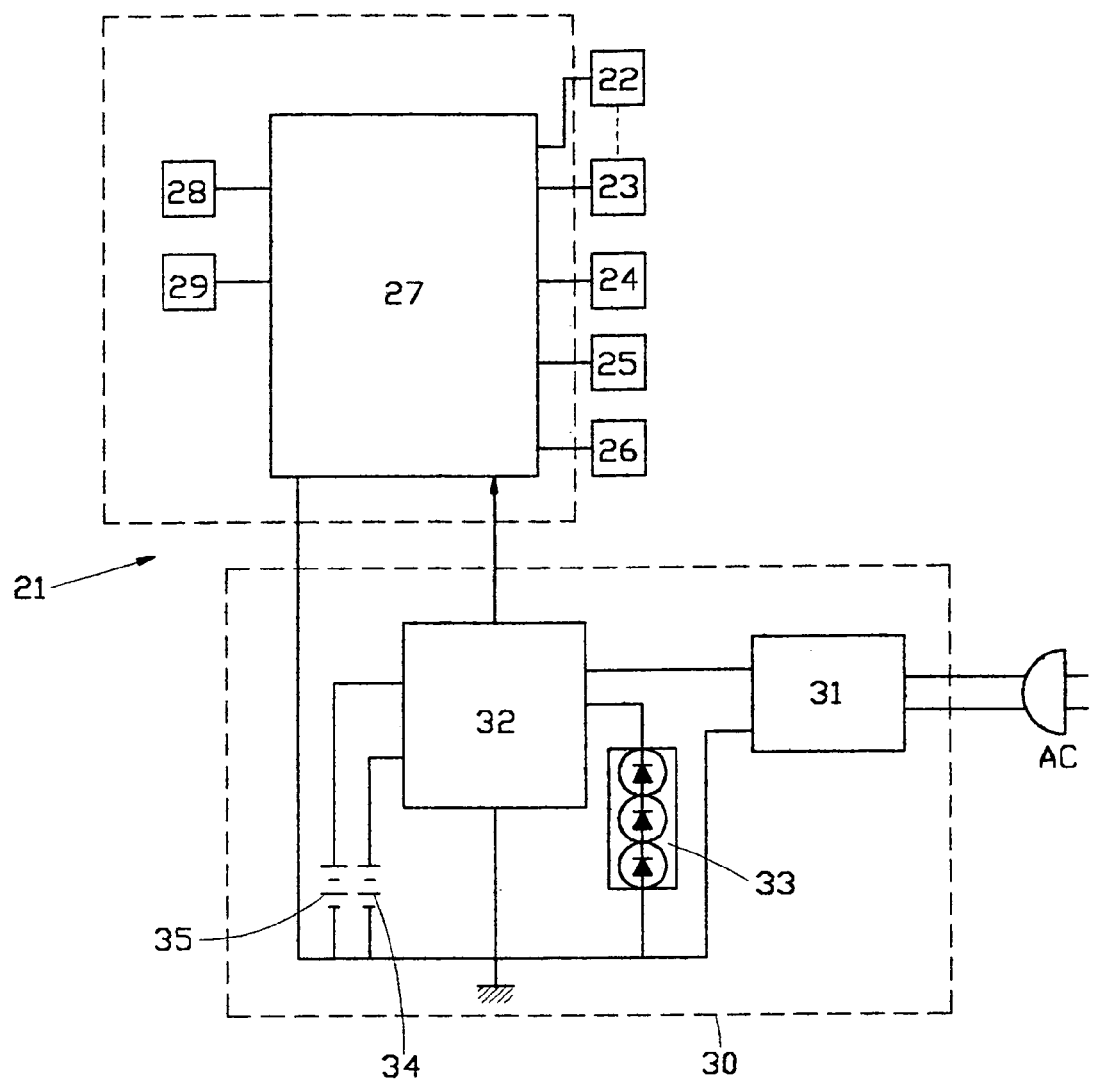
FIG. 3 is a block diagram showing a transmitting portion of the USB-based wireless transmitting/receiving system in accordance with the present invention.

FIG. 3 shows an embodiment of the transmitting portion 21. The transmitting portion 21 comprises at least a central processing unit 27, a transmitting unit 28, a receiving unit 29 and a power supply system 30. The central processing unit 27 receives and processes signals from the peripheral devices 22–26. The transmitting unit 28 is connected to the central processing unit 27 and transmits the processed signals to the receiving portion 40. The receiving unit 29 receives signals issued by the computer host 42 and transfers the signals to the central processing unit 27.

The power supply system 30 is coupled to the central processing unit 27 for powering the central processing unit 27. The power supply system 30 may comprise any suitable electrical/electronic devices. In the embodiment illustrated, the power supply system 30 is adapted to be connected to an electric main, such as a wall outlet (not shown), for receiving alternate current therefrom. The power supply system 30 comprises a controller 32 which is coupled to the electric main via a regulation circuit 31. The regulation circuit 31 receives and regulates the alternate current from the electric main and supplies, under the control of the controller 32, the regulated power to the central processing unit 27.

The power supply system 30 further comprises an auxiliary power supply unit selectively including a primary battery set 34, a secondary battery set 35 and a solar cell system 33. The primary battery set 34, the secondary battery set 35 and the solar cell system 33 are all connected to the controller 32 whereby the controller 32 may selectively supply power to the central processing unit 27 from the electric main, the primary battery set 34, the secondary battery set 35 and the solar cell system 33.

Figure 4:
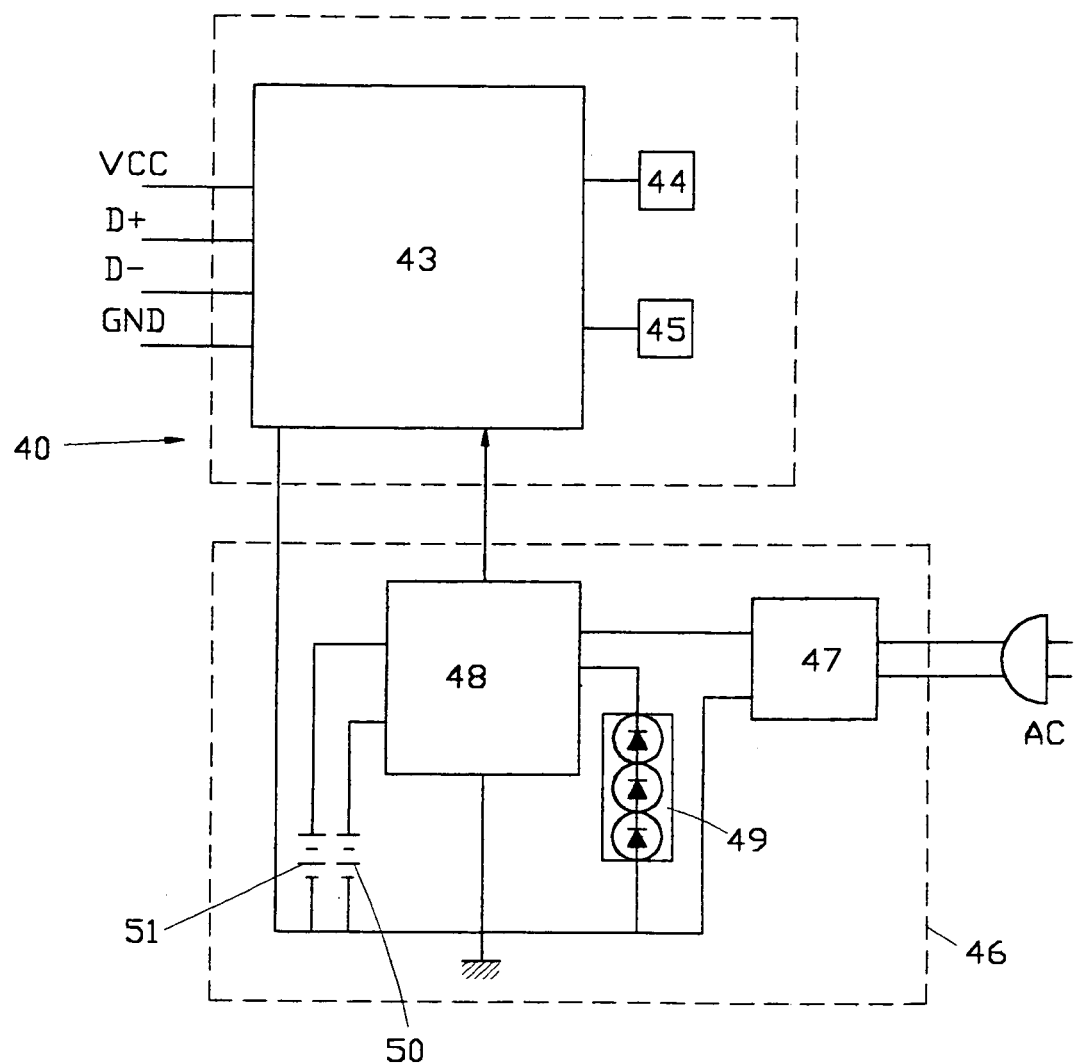
FIG. 4 is a block diagram showing a receiving portion of the USB-based wireless transmitting/receiving system in accordance with the present invention.

FIG. 4 shows an embodiment of the receiving portion 40. The receiving portion 21 is coupled to the computer host 42 and comprises at least a central processing unit 43, a receiving unit 44, a transmitting unit 45 and a power supply system 46. The central processing unit 43 receives and processes signals that are transmitted from the peripheral devices 22–26 via the transmitting portion 21 and received by the receiving unit 44 thereof. The transmitting unit 45 is connected to the central processing unit 43 and transmits signals from the central processing unit 43 to the peripheral devices 22–26 via the transmitting portion 21.

The power supply system 46 is coupled to the central processing unit 43 for powering the central processing unit 43. The power supply system 46 may comprise any suitable electrical/electronic devices. In the embodiment illustrated, the power supply system 46 is adapted to be connected to an electric main, such as a wall outlet (not shown), for receiving alternate current therefrom. The power supply system 46 comprises a controller 48 which is coupled to the electric main via a regulation circuit 47. The regulation circuit 47 receives and regulates the alternate current from the electric main and supplies, under the control of the controller 48, the regulated power to the central processing unit 43.

The power supply system 46 further comprises an auxiliary power supply unit selectively including a primary battery set 50, a secondary battery set 41 and a solar cell system 49. The primary battery set 50, the secondary battery set 51 and the solar cell system 49 are all connected to the controller 48 whereby the controller 48 may selectively supply power to the central processing unit 43 from the electric main, the primary battery set 50, the secondary battery set 51 and the solar cell system 49.

In an initial set-up operation of the wireless transmitting/receiving system, a peripheral device, such as the keyboard 22, is connected to the transmitting portion 21. The transmitting portion 21 detects the insertion of the peripheral device and requests the peripheral device to provide a signal for identifying the type thereof. The signal is then transmitted to the receiving portion 40 which in turn applies the signal to the computer host 42.

In a normal operation, the peripheral device generates data to the transmitting portion 21. The transmitting portion 21 processes and transmits the data in wireless fashion to the receiving portion 40. The receiving portion 40 processes and transmits signals received from the transmitting portion 21 to the computer host 42.

If the peripheral device is a USB Human Input Device (HID), the peripheral device is capable to enter a suspend mode for the purposes of saving power consumption when no input from a user has been detected after a given period. Once a signal is detected, for example one key of the keyboard 22 is struck, a remote wake up function is initiated and transmitted through the transmitting portion 21 and the receiving portion 40 to the computer host 42.

It can be understood from the above description of a preferred embodiment that the present invention possesses all the advantages that can be observed in a wire-connected USB system as well as the benefits provided by a wireless system. The advantages include at least:

(1) A single connection device allows the connection with all types of USB-based device.

(2) The number of the USB-based devices connected together is not limited.

(3) It is capable to automatically detect and configure the peripheral devices connected to a computer host, namely the "plug-and-play" function.

(4) It is capable to support new USB-based devices and allows upgrading.

(5) It allows the system to enter the suspend mode for power saving purposes.

(6) It allows remote wake up.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A USB-based wireless transmitting/receiving system comprising:
   a computer host; and,
   at least one USB-based peripheral device operatively coupled directly to the computer host by a communications unit, the communications unit including:
      a transmitting portion connected to the at least one USB-based peripheral device for receiving a signal from the peripheral device;
      a receiving portion connected to the computer host and operatively coupled to the transmitting portion by the wireless link for receiving and applying the signal transmitted by the transmitting portion to the computer host.

2. The USB-based wireless transmitting/receiving system as claimed in claim 1, wherein the wireless coupling between the transmitting portion and the receiving portion comprises infrared transmission.

3. The USB-based wireless transmitting/receiving system as claimed in claim 1, wherein the wireless coupling between the transmitting portion and the receiving portion comprises radio frequency transmission.

4. The USB-based wireless transmitting/receiving system as claimed in claim 1, wherein the transmitting portion comprises a central processing unit to which a transmitting unit and a receiving unit are connected and a power supply system for powering the central processing unit.

5. The USB-based wireless transmitting/receiving system as claimed in claim 4, wherein the power supply system comprises a controller to which a primary power source and an auxiliary power source are connected whereby the controller selectively supplies power from the primary power source and the auxiliary power source to the central processing unit.

6. The USB-based wireless transmitting/receiving system as claimed in claim 5, wherein the auxiliary power source selectively comprises a primary battery set, a secondary battery set and a solar cell system.

7. The USB-based wireless transmitting/receiving system as claimed in claim 1, wherein the receiving portion comprises a central processing unit to which a transmitting unit and a receiving unit are connected and a power supply system for powering the central processing unit.

8. The USB-based wireless transmitting/receiving system as claimed in claim 7, wherein the power supply system comprises a controller to which a primary power source and an auxiliary power source are connected whereby the controller selectively supplies power from the primary power source and the auxiliary power source to the central processing unit.

9. The USB-based wireless transmitting/receiving system as claimed in claim 8, wherein the auxiliary power source selectively comprises a primary battery set, a secondary battery set and a solar cell system.

10. A USB-based computer system comprising:
  (a) a single computer host;
  (b) at least one USB-based peripheral device; and,
  (c) a communications unit wirelessly coupling said USB-based peripheral device to said computer host, said communications unit including:
    (1) a transmitting portion connected to said USB-based peripheral device for wirelessly transmitting a signal generated thereby; and,
    (2) a receiving portion connected to said computer host operatively coupled to said transmitting portion by a wireless link for receiving and applying to the computer host the signal transmitted by the transmitting portion;
    each said transmitting and receiving portion having a primary power source, at least one auxiliary power source, and a controller coupled thereto, said controller selectively actuating one of said primary and auxiliary power sources.

11. The USB-based computer system as recited in claim 10 wherein said auxiliary power source is selected from the group consisting of: a primary battery set, a secondary battery set, and a solar cell system.

12. The USB-based computer system as recited in claim 10 further comprising a plurality of said auxiliary power sources, said power sources including a primary battery set, a secondary battery set, and a solar cell system.

* * * * *